United States Patent [19]

Pürstinger et al.

[11] Patent Number: 4,685,879

[45] Date of Patent: Aug. 11, 1987

[54] CALIBRATOR FOR EXTRUDED MATERIAL

[76] Inventors: Franz Pürstinger, Brunlehnerstr. 11, A 4540 Bad Hall; Siegfried Topf, Waldmüllerweg 24, A-4050 Traun, both of Austria

[21] Appl. No.: 874,279

[22] Filed: Jun. 13, 1986

[30] Foreign Application Priority Data

Jun. 13, 1985 [AT] Austria ................... 1770/85

[51] Int. Cl.$^4$ ................ B29C 55/18; B29C 59/00; B29C 47/12
[52] U.S. Cl. ................... 425/383; 72/467; 425/325; 425/385; 425/461
[58] Field of Search ........... 264/177.1, 177.16, 177.17, 264/284, 299; 425/325, 383, 385, 461; 72/176, 467

[56] References Cited

U.S. PATENT DOCUMENTS 4,115,495 9/1978 Hartitz .................... 264/159
4,361,530 11/1982 Peer ...................... 425/325

FOREIGN PATENT DOCUMENTS 2218557 10/1973 Fed. Rep. of Germany .
1316597  3/1963 France .
2386408  4/1978 France .
1368033  9/1974 United Kingdom .

Primary Examiner—Willard E. Hoag
Attorney, Agent, or Firm—Karl F. Ross; Herbert Dubno

[57] ABSTRACT

The calibrator for plate like extruded products, particularly a wall section composed of a plastic, comprises an upper portion, a lower portion connected to the upper portion and a gap for the extruded material formed between them, the upper and lower portions being pivotally connected on one side by a pivot member. To allow a rapid and easy closing and opening of this calibrator a pivoting member pivotally attached to these portions and positioned for locking of the upper with the lower portion is provided. Further in the calibrator a cooling means through which a cooling medium, for example water, flows is provided. For even more efficient cooling a snake like channel for the cooling medium running transverse to the extrusion direction is provided. Both the above features can be employed independently of each other or used jointly.

18 Claims, 6 Drawing Figures

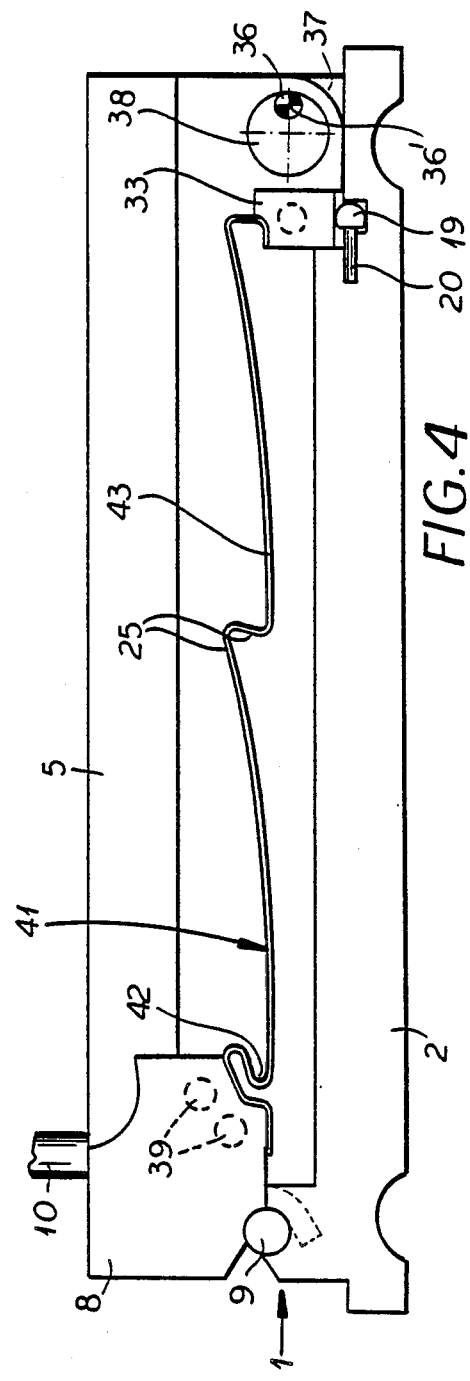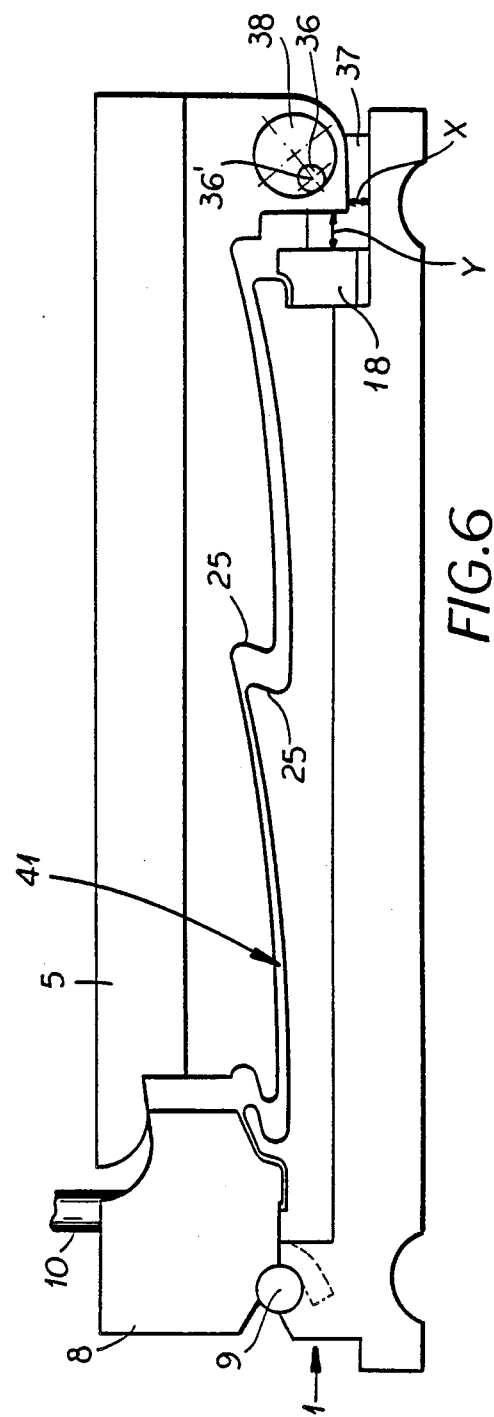

CALIBRATOR FOR EXTRUDED MATERIAL

FIELD OF THE INVENTION

Our present invention relates to a calibrator or sizer/-cooler for extruded material, particularly a plate-like wall section composed of a synthetic resin (plastic), i.e. a length of siding.

BACKGROUND OF THE INVENTION

A calibrator or sizer for imparting the final dimensions to a length of siding can comprise an upper portion, a lower portion connectable to the upper portion and a gap formed between them and into which the length of extruded material can be received.

The calibrator (see, for example, German patent document DE-AS No. 22 18 557) had a lower portion on which the upper portion sits and after centering could be screwed and/or pinned or otherwise brought together. The opening and closing of this calibrator thus requires considerable time and work. Additionally there is danger of clamping or pinching the extruded material and/or of otherwise causing defects to occur. These disadvantages are not essentially changed when the upper and lower portion are pivotally connected to each other by a pivot bearing.

The calibrator is usually cooled with water. This can circulate in a cooling jacket positioned around the calibrator tube. It flows in the water jacket turbulently and generally in the extrusion direction (Austrian Patent No. 322 824). Water can also be conducted in longitudinal passages which run in the extrusion direction; however since in this case different spacings of these passages are required to effect different cooling of the extrudate it leads to increased surface stresses in the extrusion and to reduced output.

OBJECTS OF THE INVENTION

It is an object of our invention to provide an improved calibrator, particularly for a broad plate-like extruded product such as building siding which eliminates drawbacks encountered with the prior art.

It is also an object of our invention to provide an improved calibrator which is quickly and easily opened and which cools the extruded product uniformly.

SUMMARY OF THE INVENTION

These objects and others which will become more apparent hereinafter are attained in a calibrator having an upper portion, a lower portion connected to the upper portion and a gap or spacing for receiving the extruded material between the upper and lower portions. The upper and lower portions are pivotally connected with each other on one side by a pivot bearing.

According to our invention for locking the upper and lower portions of the calibrator together a pivoting member pivotally attached to one of these portions is provided. This permits above all a rapid closing of the apparatus after feeding in the extruded material and a precise sizing of an extruded product without complex operations, without pinching the product and with the facility for a rapid opening.

The objects of our invention are also attained in a calibrator with a cooling means through which a cooling medium, for example water, flows. According to our invention the channel for the cooling medium is snake like (undulating or loop-shaped) running transverse to the direction of extrusion. In this way a particularly uniform cooling results, namely a cross section conforming cooling, whereby a linear and stress-free sizing of a length of extruded material is obtained. These features of our invention are advantageously combined in various ways.

Advantageously the pivoting member of our calibrator has a pivot axis which is substantially parallel to the axis of the pivot bearing of the upper and lower portions of the calibrator and parallel to the extrusion direction and is lockable in position by a screw spindle. The pivoting member and the lateral surfaces adjacent the pivoting member of the portion to be locked can have fitting contacting surfaces which are formed by part of the surfaces of two coaxial circular cylinders whose cylinder axis is the pivot axis of the pivoting member. A nose can project on the lower end of the contacting surfaces of the portion of the calibrator to be locked which engages under the pivoting member in a locked position. A bridge of this nose coincides with the lower end of the contacting surfaces of the pivoting member when the calibrator is closed.

The pivot bearing advantageously comprises a pivot shaft attached to the lower portion which engages an eye in the upper portion. The upper and the lower portions can also be pivotally connected to each other by an eccentric bearing. Before folding out the upper portion the eccentric bearing allows the upper and the lower portions to be displaced parallel to each other and to be lifted a given distance from each other. The axis of the eccentric shaft is fixed in place on the lower portion of the calibrator on a supporting piece and an eccentric disk connected eccentrically to the eccentric shaft comprises the pivot bearing.

According to another feature of our invention between the upper and lower portions of the calibrator molding plates bounding the passage for the extruded material are provided in the upper and lower portions, and an adjustable insertable piece is mounted on at least one of the upper and lower portions for forming the extruded product with back cut portions. For adjustment of the insertable piece a boltable eccentric piece is provided.

The calibrator can also have a cooling means through which a cooling medium, for example water, flows in a snake shaped channel as mentioned above. The channel for flow of the cooling medium can be bounded by a plurality of transverse walls which divide the passage for the extruded material. For making good quality wall sections with undercuts the insertable piece provided in the vicinity of the undercut portion can be provided with cooling by a cooling duct connected to the snake shaped channel for the flow of cooling medium. The transverse walls can be rigidly attached to the bottom and/or cover plates of the upper and lower portions of the calibrator and the molded plates bounding the passage for the extruded material. A plurality of bars can be attached transversely to the flow direction of the cooling medium and/or to the bottom and/or cover plate of the upper and lower portions of the calibrator. The pivoting member can also be provided with cooling ducts for cooling.

BRIEF DESCRIPTION OF THE DRAWINGS

The above and other objects, features and advantages of our invention will become more readily apparent from the following description, reference being made to the accompanying drawing in which:

FIG. 3 is a cross sectional view of the calibrator of FIG. 1 taken through the cooling means as seen in the extrusion direction to illustrate the flow of the cooling medium;

FIG. 4 is a side elevational view of a second embodiment of a calibrator according to our invention with an eccentric as pivot bearing in the closed state similar to FIG. 1;

FIG. 6 is a side elevational view of the calibrator according to FIG. 5 in an intermediate position.

SPECIFIC DESCRIPTION

Figure 1:
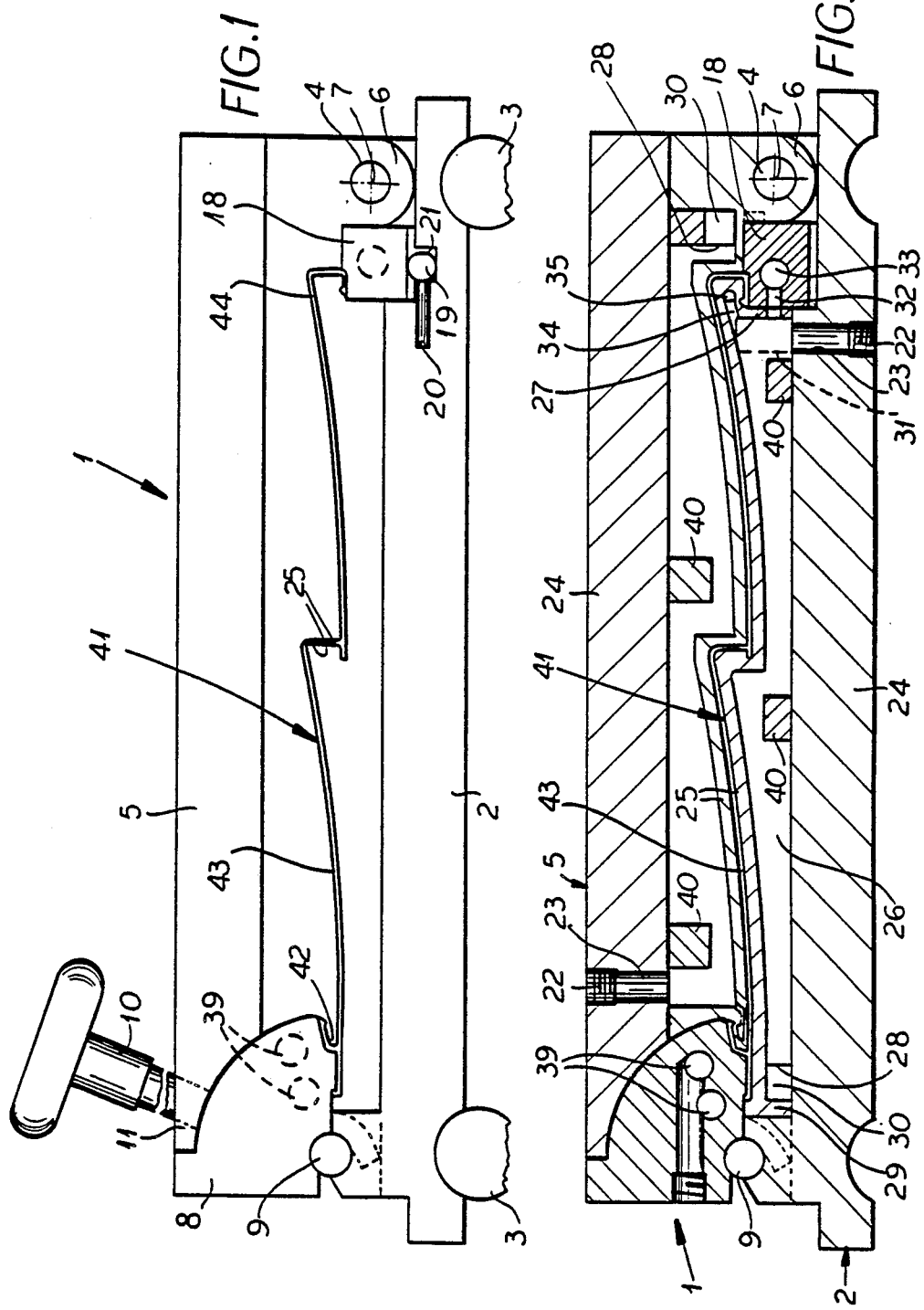
FIG. 1 is a side elevational view of a first embodiment of a calibrator according to our invention in the closed state with a simple pivot bearing.

Both embodiments shown in the drawing are calibrators or sizers for a wall section, e.g. lengths of siding, extruded as described in German Printed Patent Application No. 22 18 557. The wall section has a suspending edge, a bounding edge and a connecting plate between these edges formed from an extruded strip of material.

Figure 2:
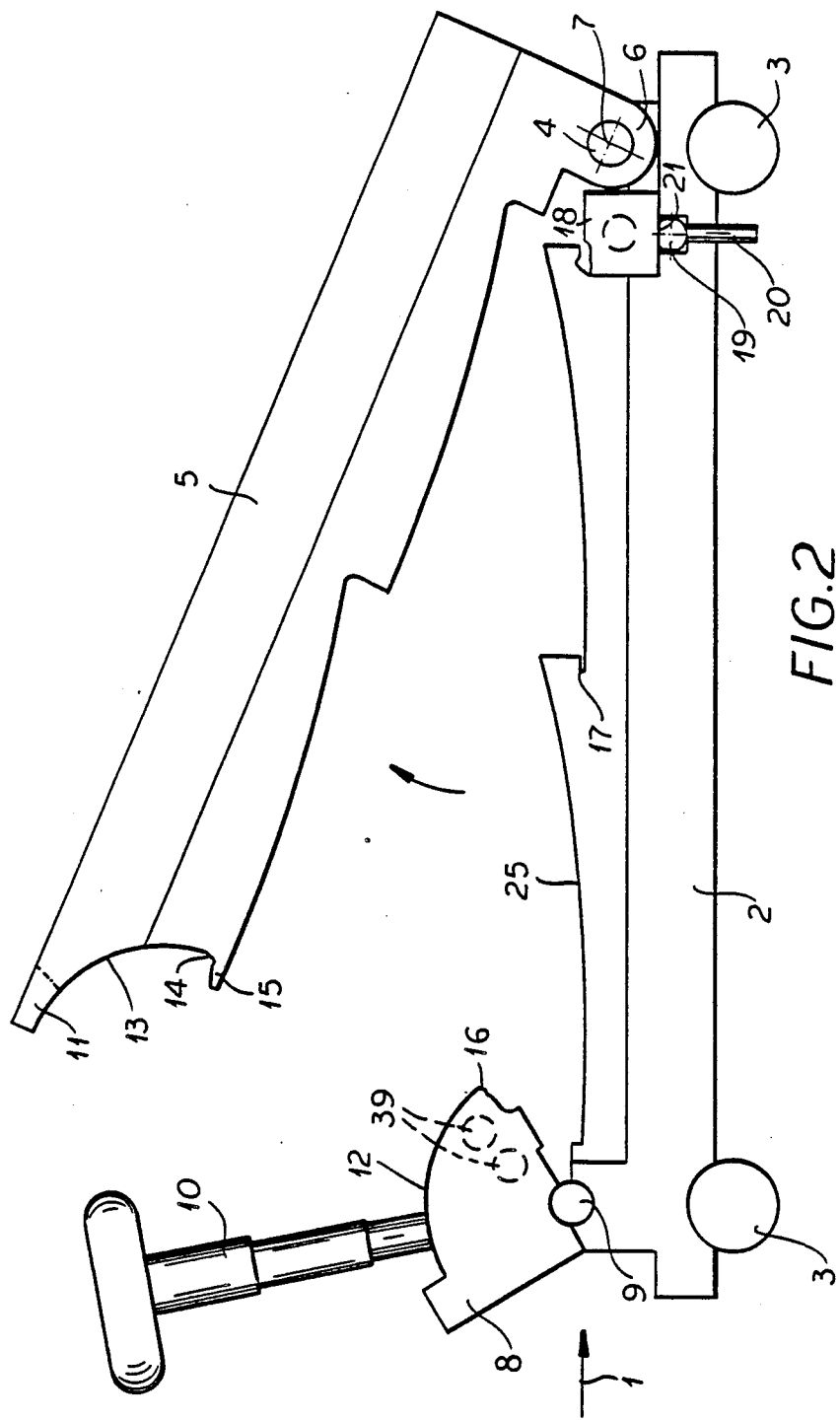
FIG. 2 is a side elevational view of the calibrator of FIG. 1 in the open state.

In the first embodiment according to FIGS. 1 to 3 the calibrator 1 comprises a lower portion 2 which is supported on supporting rods 3 and on its right end in the drawing is provided with a pivot shaft 4, which is enclosed by an eye 6 in the upper portion 5 so that a pivoting of the upper portion 5 about the pivot axis 7 in the clockwise sense as shown by the arrow in FIG. 2 is allowed. Also a rapid opening and closing of the calibrator is thus permitted. Together pivot shaft 4 and pivot eye 6 comprise a pivot bearing.

At the left end of the lower portion 2 a pivoting member 8 is pivotally attached to it so as to be rotatable about the axis 9. This pivoting member 8 carries a screw spindle 10 with whose aid in the closed position shown in FIG. 1 the calibrator is lockable with the bifurcated end 11 of the upper portion 5 held down by the screw spindle 10 fixed against the pivoting member 8. The screw spindle 10 fits into the notch of the bifurcated end 11 and presses it downwardly.

One side of the top portion 12 of the pivoting member 8 and the lateral surface 13 of the upper portion 5 adjacent top portion 12 form contacting surfaces which are part of the surfaces of coaxial circular cylinders whose axes coincide with the pivot axis 9 of the pivoting member 8 and which fit together as shown in FIG. 1.

Between the upper side of lower portion 2 and the lower side of the upper portion 5 there is a passage 41 for the extruded material shaped like the above mentioned wall section. This passage 41 has a section corresponding to the suspending edge of the wall section 42, a section corresponding to the bounding edge 44 and a section for the connecting plate between these two edges. Since the wall section at its right end in FIGS. 1 and 3 is provided with the bordering bounding edge 44 and at its left end with the suspending edge 42 between which the central offset connecting plate extends, additional specific steps in the construction of the calibrator are required.

Thus for construction of a first undercut portion of the suspending edge a projecting nose 14 is positioned at the left lower end of the upper portion whose bridge portion 15 coincides with the lower end edge 16 of the contacting surface 12 in the closed position as seen in FIG. 1.

In the center of the connecting plate the second undercut portion 17 is formed in lower portion 2 and for formation of the third undercut portion for the suspending edge an insertable piece 18 is provided under the adjacent lateral surfaces of the upper portion 5 and the lower portion 2 which is completely adjustable by a boltable eccentric 19 to release the manufactured wall section.

In the closed position shown in FIG. 1 the handle 20 of the eccentric 19 is horizontal. In the open position of FIG. 2 the handle 20 is rotated counterclockwise to the vertical, whereby the insertable piece 18 resting on the upper side 21 of the eccentric 19 facing it is lowered and the opening of the mold for the wall section is allowed.

For cooling the calibrator a path for flow of the cooling medium, for example water, is provided. As shown in FIG. 3 both the upper portion 5 and the lower portion 2 have an inlet 23 supplied by a principal inlet pipe (not shown) closable with a stopper member 22. These inlets 23 extend from the upper to lower sides of the upper portion 5 and the lower portion 2 and open into a hollow space which is bounded by the bottom and/or deck plate 24 of either the upper or lower portions 5 or 2 and the actual molding plate 25 which determines shape of the passage 41 for the extruded material and thus the shape of the wall section.

This hollow space in the lower portion 2 is divided by a plurality of transverse walls running transverse to the extrusion direction of the wall section, of which the first transverse wall 26 extends from the side wall 27 of the molding plate 25 on the right in FIG. 3 and ends at the edge 28 spaced from the left side wall 29 of the molding plate 25. The second transverse wall 30 in the extrusion direction is fastened to the left side wall 29 and ends at the edge 31 spaced from the right side wall 27 as shown by the dashed lines in FIG. 3 etc. In this way the path of the cooling water in the lower portion 2 under the molding plate 25 is snake like. Correspondingly transverse walls 26 and 30 are provided in the upper portion 5. At the end of the path of cooling water flow cooling water outlets are provided.

Associated with this snake like or undulating principal flow path two additional auxiliary flow paths are provided, namely including a first inlet 32 for a cooling path in the insertable member 18 and a passage or duct 33 running in the longitudinal direction in it as well as a corresponding unshown outlet, and a second inlet 34 in the lower bottom molding plate 25 for the undercut portion at the bounding edge 44 of the wall section, a passage 35 in it and an unshown outlet.

Additional cooling ducts 39 are provided in pivoting piece 8 for cooling the undercut portion of the suspending edge 42 of the wall section.

In order to attain an exact profile conforming cooling bars 40 are mounted transverse to the flow direction on the base and/or deck plates 24 of the upper and lower portions 2 and 5 in the hollow space of the upper and lower portions 2 and 5 and to their mold plate 25, which channel the flowing water to contact or wash the corners and/or angles of the mold plate 25.

Figure 5:
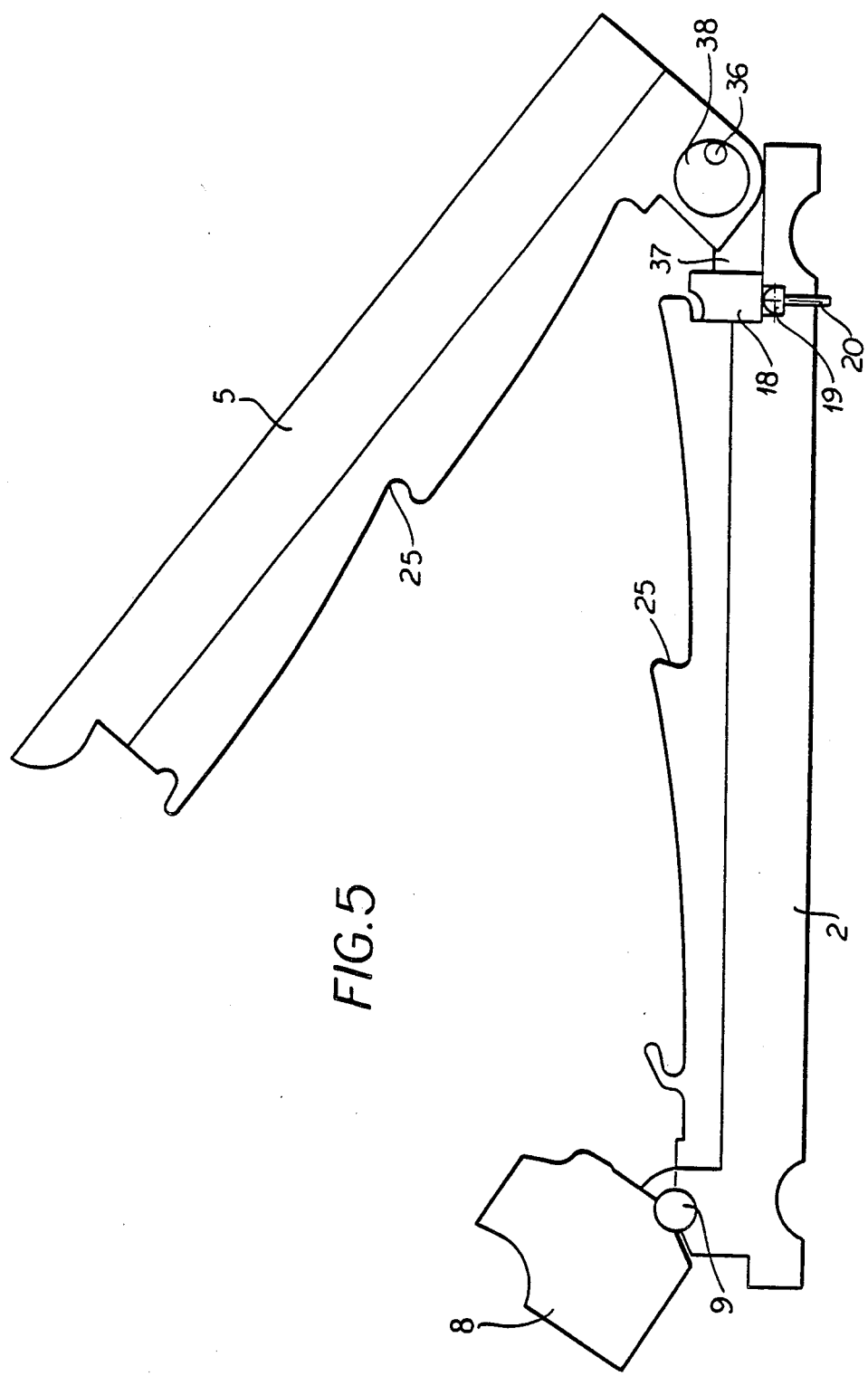
FIG. 5 is a side elevational view of the calibrator according to FIG. 4 in the open state.

The embodiment of the calibrator shown in FIGS. 4 to 6 differs from that of FIGS. 1 to 3 by an easily changed cross sectional shape for the wall section and by employing an eccentric disk 38 connected to an eccentric shaft 36 as pivot bearing for connecting the upper portion 5 with the lower portion 2 of the calibrator.

As shown in FIG. 4 the undercut suspending edge of the wall section is formed by a clasp like curved passage in a hook shape, and the connecting plate has a simple central Z-shaped jog forming an undercut portion. To form the bordering bounding edge 44 an insertable piece 18 raisable and lowerable with the help of a boltable eccentric piece 19 is provided, whose raised position in the open calibrator is seen in FIG. 5 and besides is similar to that in FIGS. 1 to 3.

The eccentric shaft 36 connecting the upper portion 5 and the lower portion 2 has an eccentric axis 36'. Eccentric shaft 36 is mounted on the supporting piece 37 of the lower portion 2. This eccentric shaft 36 has an eccentric disk 38 attached eccentrically to it on which the upper portion 5 is rotatable.

On rotation about the eccentric axis 36' and thus the eccentric disk 38 in the clockwise direction starting from the closed position shown in FIG. 4 (which is also the working position of the calibrator) to reach an angle of 135° which corresponds to an intermediate position of the calibrator shown in FIG. 6 in which the upper portion 5 opposite the lower portion 2 is raised a definite extent X and is displaced a definite amount Y to the right no engagement exists between the lower portion 2 and the upper portion 5 so that all undercut portions of the molded plate are lifted.

Hence the upper portion 5 can be pivoted upwardly in a clockwise direction (in the direction of the arrow in FIG. 5), namely into the open position of the calibrator in which the pivoting member 8 can be pivoted in the counterclockwise direction for complete release of the mold plate 25. To close the calibrator these operations are effected in a reverse sequence.

Variations of the above embodiments within the scope of our invention are also possible. Although the calibrator was described as one for making a wall section, it is not restricted to that and it can also be used for another extruded product, advantageously, however for plate like cross section products. As a working material for manufacture of a wall section hardened polyvinyl chloride is particularly suitable.

We claim:

1. In a calibrator for a plate like extruded material, for a wall section composed of a body of plastic material, having an upper portion, a lower portion connectable with said upper portion and a gap between said upper and lower portions for receiving said body, said upper and lower portions being pivotally connected to each other on one side by a pivot bearing, the improvement wherein a locking member is pivotally attached to one of said upper and lower portions and engageable with the other of said portions for locking said upper and said lower portions together.

2. The improvement according to claim 1 wherein said pivoting member has a pivot axis which is substantially parallel to the axis of said pivot bearing and substantially parallel to a longitudinal dimension of the body and said locking member is lockable by a screw spindle.

3. The improvement according to claim 2 wherein said pivoting member and the lateral surfaces adjacent said pivoting member of said portion to be locked have fitting contacting surfaces which are formed by a part of the surfaces of coaxial circular cylinders whose cylinder axis coincides with said pivot axis of said pivoting member.

4. The improvement according to claim 3 wherein a nose projects on the lower end of said contacting surfaces of said portion to be locked which engages under said locking member in a locking position of said pivoting member.

5. The improvement according to claim 4 wherein a bridge of said nose coincides with the lower end of said contacting surfaces of said locking member with said calibrator closed.

6. The improvement according to claim 1 wherein said upper and said lower portions are pivotally connected to each other by an eccentric bearing with which before folding out said upper portion said upper and said lower portions are displaceable parallel to each other and said upper portion can be lifted a given distance from said lower portion.

7. The improvement according to claim 6 wherein an eccentric shaft is fixed in place on said lower portion on a supporting piece and an eccentric disk connected eccentrically to said eccentric shaft comprises said eccentric bearing or said pivot bearing.

8. The improvement according to claim 1 wherein between said upper and lower portions molding plates bounding said passage are provided in said upper and lower portions, and an adjustable insertable piece is mounted on at least one of said upper and lower portions to provide a undercut portion in said wall section.

9. The improvement according to claim 8 wherein for adjustment of said insertable piece a boltable eccentric piece is provided.

10. In a calibrator according to claim 1 with a cooling means through which a cooling medium, for example water, flows, the improvement wherein a snake shaped channel for said cooling medium running transverse to the extrusion direction is provided in both said upper and lower portions of said calibrator.

11. The improvement according to claim 10 wherein said snake shaped channel for said flow of said cooling medium is bounded by a plurality of transverse walls.

12. The improvement according to claim 11 wherein for making said wall sections with a undercut portion said insertable piece provided in the vicinity of said undercut portion is provided with cooling by a cooling duct connected with said snake shaped channel for said flow of said cooling medium.

13. The improvement according to claim 11 wherein said transverse walls are rigidly attached to said bottom and/or deck plate of said upper and lower portions of said calibrator and to said molded plates bounding said passage for said extruded material.

14. The improvement according to claim 10 wherein a plurality of bars is provided positioned transversely to the flow direction of said cooling medium.

15. The improvement according to claim 14 wherein at least one additional cooling duct is provided in said locking member.

16. A calibrator for a plate like extruded material, for wall section composed of a plastic material comprising:
   an upper portion;
   a lower portion pivotally connectable with said upper portion by a pivot bearing;
   a mold plate with a gap between said upper and lower portions for said extruded material;
   a cooling means including a snake shaped channel bounded by a plurality of transverse walls and having an inlet and an outlet in both said upper and lower portions:

a locking member pivotally attached to one of said upper and lower portions and engable with the other of said portions for locking said upper and said lower portions together when said calibrator is closed, wherein said locking member has a pivot axis which is substantially parallel to the axis of said pivot bearing of said upper and lower portions and substantially parallel to a longitudinal dimension of the extrusion and;

a screw spindle attached to said pivoting member which can lock said locking member in position when said calibrator is closed.

17. A calibrator according to claim 16 wherein said pivot bearing comprises a pivot eye attached to said upper portion and a pivot shaft attached to said lower portion engaged in said pivot eye.

18. A calibrator according to claim 16 wherein said pivot bearing comprises an eccentric shaft connected to said lower portion which is attached eccentrically to an eccentric disk attached to said upper portion.

* * * * *